April 27, 1954 R. T. BUHL 2,676,725

TAPE APPLYING APPARATUS

Filed April 14, 1950 5 Sheets-Sheet 1

INVENTOR
Raymond T. Buhl

BY Robert M. Dunning
ATTORNEY

INVENTOR
Raymond T. Buhl
BY Robert M. Dunning
ATTORNEY

INVENTOR
Raymond T. Buhl
BY Robert M. Dunning
ATTORNEY

April 27, 1954 R. T. BUHL 2,676,725

TAPE APPLYING APPARATUS

Filed April 14, 1950 5 Sheets-Sheet 4

INVENTOR
Raymond T. Buhl
BY Robert M. Dunning
ATTORNEY

INVENTOR
Raymond T. Buhl
BY Robert M. Dunning
ATTORNEY

Patented Apr. 27, 1954

2,676,725

UNITED STATES PATENT OFFICE 2,676,725

TAPE APPLYING APPARATUS

Raymond T. Buhl, White Bear Lake, Minn.

Application April 14, 1950, Serial No. 155,874

11 Claims. (Cl. 216—30)

My invention relates to an improvement in tape applying apparatus and deals particularly with an apparatus designed to attach a stamp or a piece of tape in a folded condition about the edge of a folder.

In sending out folders or double post cards, it is common practice to fold the folder or double post card at a center point and to attach a stamp to the marginal edges of the folder or card so as to hold the folder or card in closed position until it reaches its destination. Oftentimes these stamps are attached by hand. It is the purpose of the present invention to produce a relatively inexpensive apparatus for attaching a stamp or other strip of tape to a folder to hold the same closed.

A feature of the present invention lies in the manner in which the moisture is applied to the stamp or tape. Most devices for applying stamps or tape, moisten the stamps or the tape prior to the application thereof so that the adhesive is moist at the time the stamp is applied. This system has the disadvantage that when the mailing device is halted in operation one or more of the stamps or pieces of tape gradually dry after being moistened and will not adhere in place when the next operation is again commenced. In the present device I provide a means of moistening the folder or card at the area to which the stamp is attached. The dry stamp is then folded over this moist area and is given moisture thereby. As a result the stamps or tape are not moistened prior to application and are not destroyed when the apparatus starts into operation.

A feature of the present invention lies in the provision of a means for cutting off the stamp and holding the same in the path of movement of the folder. While so engaged the stamp is clamped between a movable shearing blade and a cooperable spring. When the folder engages the stamp, the stamp is drawn from position between the shearing blade and the spring so that the stamp is automatically released when required.

A feature of the present invention lies in the provision of simple and effective means for regulating the length of the tape or stamp strip between successive cuts. By this means the length of tape may be quickly and readily regulated so that the tape or stamp roll is cut off at the proper length.

These and other objects and novel features of my invention will be more clearly and fully set forth in the following specification and claims.

In the drawings forming a part of my specification:

Figures 1, 2, 3:
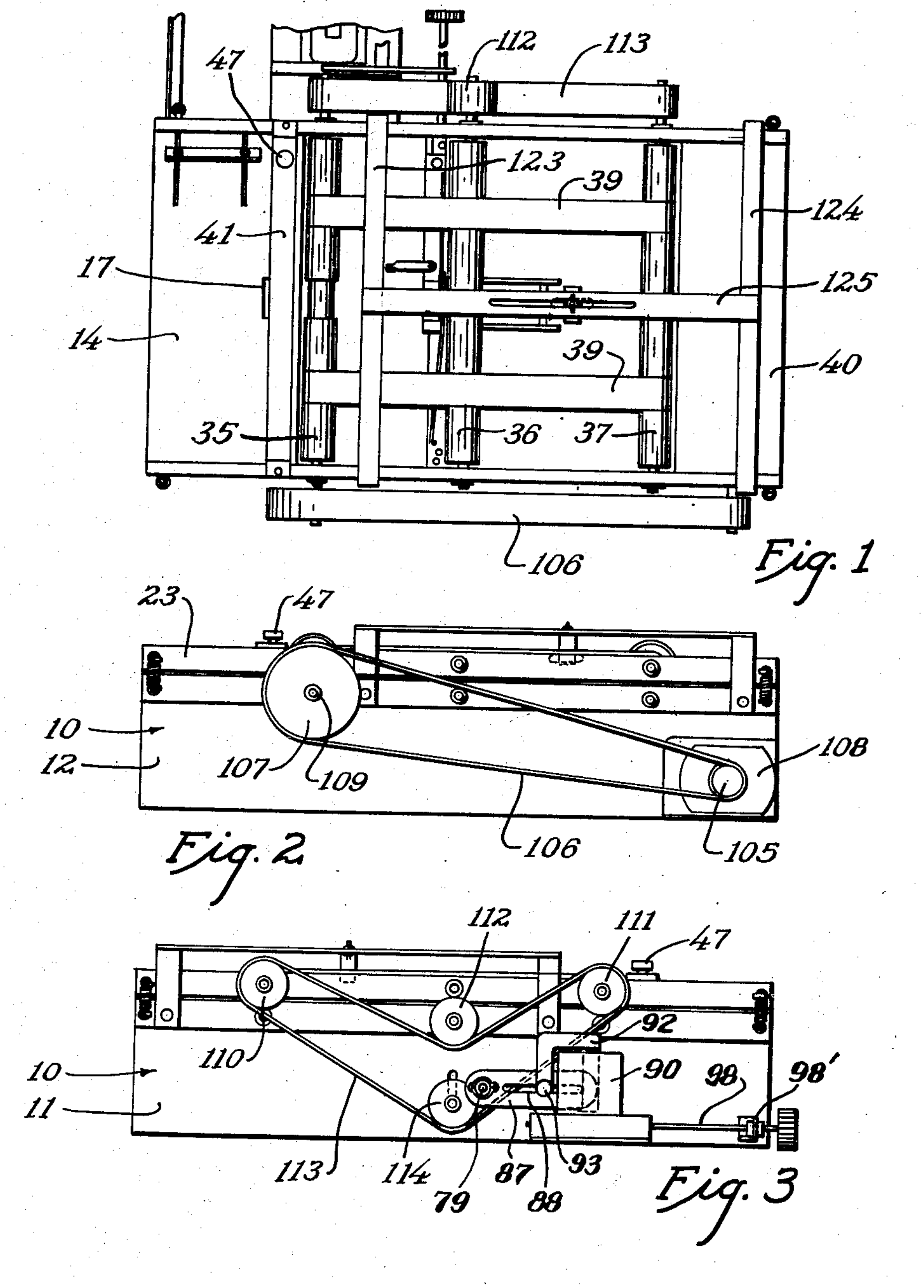
Figure 1 is a top plan view of the apparatus showing the construction thereof.
Figure 2 is a side elevational view of the apparatus shown in Figure 1.
Figure 3 is a side elevation view of the apparatus, this figure showing the side of the apparatus opposite that shown in Figure 2.

The apparatus includes a boxlike frame 10 having side walls 11 and 12 and a bottom panel 13. A feed table 14 is mounted between the side walls 11 and 12 and includes edge flanges 15 and 16 which serve to reinforce the structure. An aperture 17 is provided near the flange 16 through which the folder moistening apparatus is engageable.

A pair of bars 19 and 20 are mounted on the side walls 11 and 12 near the upper extremity thereof. These bars 19 and 20 are provided with spaced parallel dowels 21 projecting upwardly therefrom. A second pair of bars 22 and 23 are drilled in their undersurface to provide spaced apertures 24 designed to slidably accommodate the upper ends of the dowels 21. Springs 25 are provided in the apertures 24 above the dowels 21 so as to urge the bars 22 and 23 upwardly away from the bars 19 and 20.

Lugs 26 project outwardly from the bars 22 and 19 in vertically spaced relation. Springs 27 connect the lugs 26 and limit separation therebetween. Similar lugs 29 project outwardly from the bars 20 and 23 in vertically spaced relation. Springs 30 connect the lugs 29 and limit separation of the bars 20 and 23. In other words, the bars 22 and 23 are cushioned in their support and may spread apart or move closer together under spring tension and tend to remain normally spaced apart.

Three rollers 31, 32, and 33 are mounted in spaced relation between the bars 19 and 20. These rollers are grooved to accommodate conveyor belts 34. The conveyor belts 34 are stretched tautly between the rollers 31 and 33 and extend over the intermediate roller 32.

Cooperable rollers 35, 36, and 37 are supported between the bars 22 and 23 in vertical alignment with their respective rollers 31, 32 and 33. The roller 35 is directly above the roller 31; the roller 36 is above the roller 32, and the roller 37 is above the roller 33. The rollers 35, 36 and 37 are grooved to accommodate spaced conveyor belts 39 which assist in conveying the folders from the feed table 14 to the outlet end of the apparatus. An inclined discharge table 40 extends between the side walls 11 and 12 at the discharge end of the apparatus over which the folders may slide as they pass from between the opposed conveyor belts 34 and 39.

Figure 10:
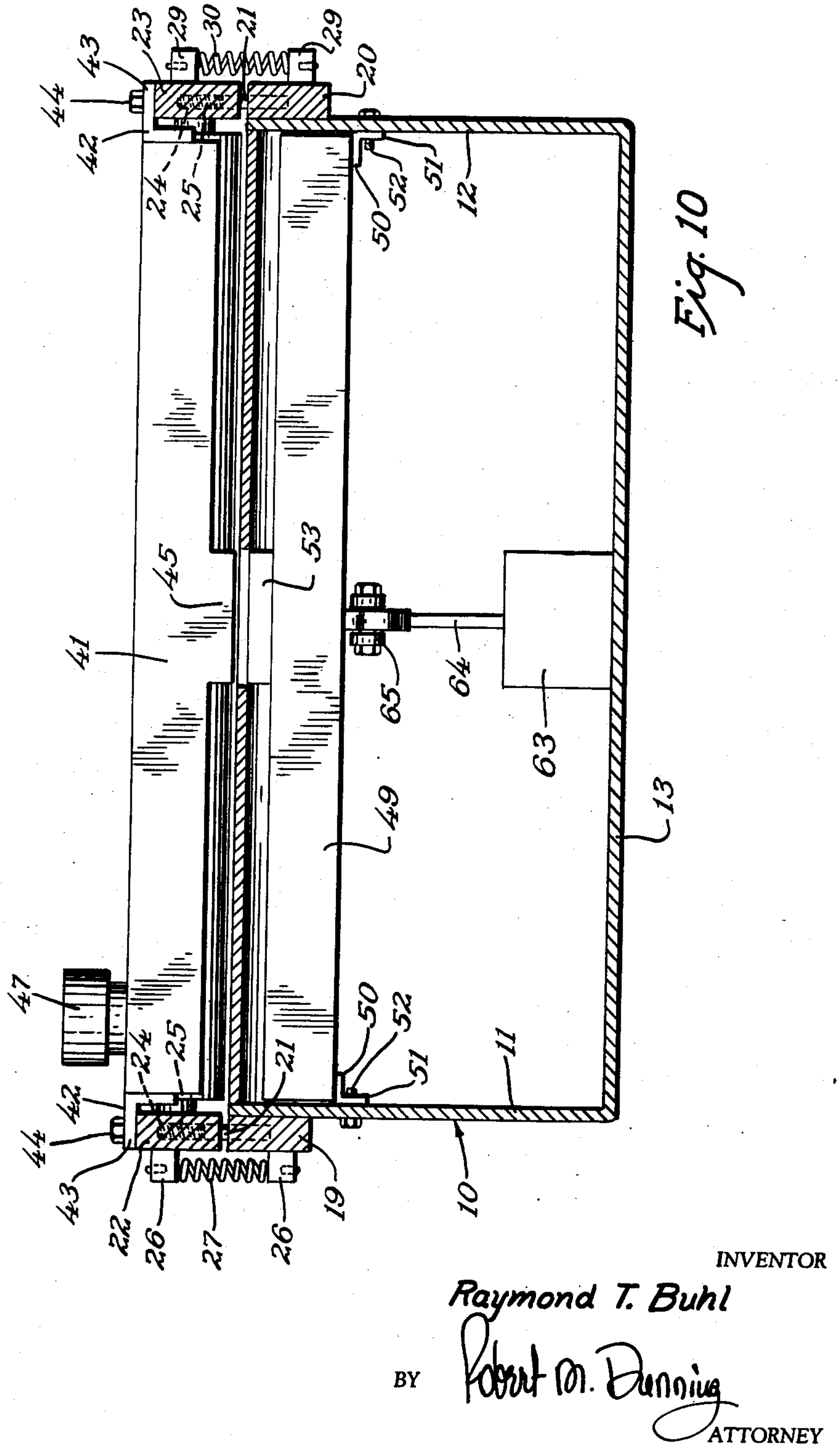
Figure 10 is a transverse sectional view through the apparatus looking toward the feed end thereof.

A folder moistening mechanism is provided at the feed end of the apparatus designed to moisten a small area of the folder to which the stamp or tape is to be attached. The moistening device includes a tank 41 supported above the level of the feed table 14. As indicated in Figure 10 of the drawings a pair of angle brackets 42 are mounted at opposite ends of the tank 41. These brackets 42 include a horizontal flange 43 which extends over the bars 22 and 23 and is attached to each bar by a bolt 44 or other suitable mechanism.

The tank 41 is provided with a central downwardly projecting portion 45 which is designed to overlie the aperture 17 in the feed table 14. This downwardly projecting portion 41 is provided at its lower extremity with a porous pad 46 which absorbs moisture, but it does not permit the moisture to drip therefrom. In other words, the porous pad 46 is moist at all times and will impart a film of moisture to a folder when an area of the folder is pressed against the pad. At the same time the moisture within the tank 41 can not drain freely therefrom. A filling cap 47 is provided on the tank by means of which the liquid in the tank may be replenished.

A second tank 49 is provided with a pair of angle brackets 50 having vertical flanges 51 pivotally connected to the side walls 11 and 12 by means of suitable pivots 52. The pivots 52 are axially aligned and act to support the tank 49 so that one end thereof may be elevated. The tank 49 is provided with an upwardly directed projection 53 which is of proper dimension to fit through the aperture 17 in the feed table. The projection 53 of the tank 49 is in opposed relation to the downward projection 45 of the upper tank 41. A wick 54 is provided within the projection 53 to absorb moisture from the tank 49. When the tank 49 is pivoted in a counter-clockwise direction from the position indicated in Figure 7, the projection 53 is elevated against the folder or the feed table 14, pressing this folder against the porous pad 46. As a result a film of moisture is applied to each side of the folder in a selected area near the free edges of the folder.

Figure 13:
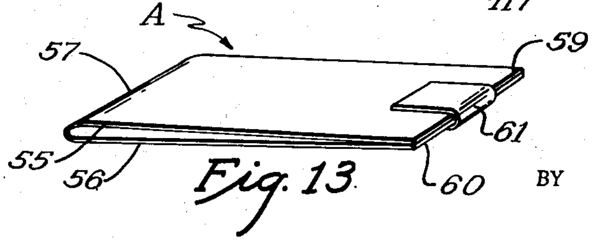
Figure 13 is a perspective view of a folder showing in general type of folder with which my apparatus is operable.

In usual practice the folder comprises two similar panels 55 and 56 as indicated in Figure 13 of the drawings. The panels 55 and 56 are connected along a fold line 57 so that the free edges 59 and 60 are in superposed relation. The stamp 61 or strip of tape attached is centrally folded so as to overlie a portion of both panels 55 and 56 near the free edges 59 and 60 thereof. The corresponding area of the folder A is moistened by the moistening apparatus.

Figure 11:
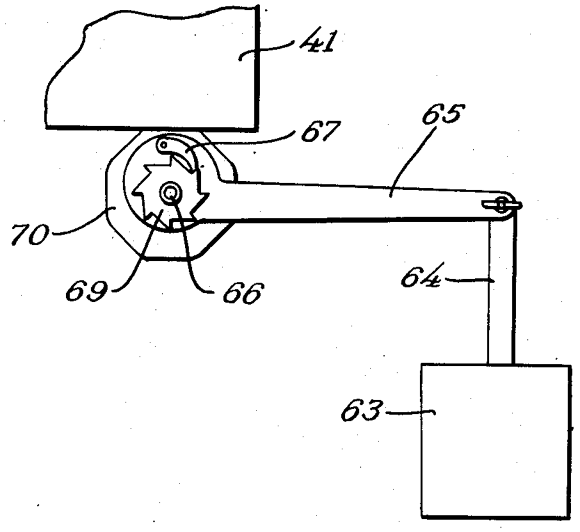
Figure 11 is a detailed view of a portion of the operating mechanism.

The mechanism for actuating the moistening apparatus is indicated diagrammatically in Figure 11 of the drawings, although various means could be employed for this purpose. A normally open switch 62 is mounted above the feed table 14 closely adjacent to the tank 41. This switch 62 is closed by the movement of a folder beneath the moistening device. The switch 62 controls a circuit which will be later described in detail, leading to a solenoid 63. The solenoid 63 acts to draw the core 64 downwardly. This core 64 is connected to an arm 65 rotatable upon a shaft 66. The arm 65 is freely rotatable upon the shaft 66. A pawl 67 is supported by the arm 65 and is engageable against a ratchet wheel 69. The ratchet wheel 69 is secured to the shaft 66 and acts to rotate the cam 70 also mounted upon the shaft 66. As the arm 65 is moved in a clockwise direction, as viewed in Figure 11, the cam 70 is quickly elevated and dropped. As a result the tank 49 is moved upwardly, quickly moistening a portion of the surface of the folder and then drops downwardly so as to not interfere with the passage of the folder through the apparatus. The switch 62 may remain closed during the passage of the folder and the solenoid core 64 remains in lowered position as long as the circuit is closed. When the circuit is broken the solenoid core 64 raises and swings the arm 65 in a counter-clockwise direction, the pawl 67 sliding over the ratchet wheel 69 and engaging a new ratchet tooth thereof.

Figures 7, 8, 9:
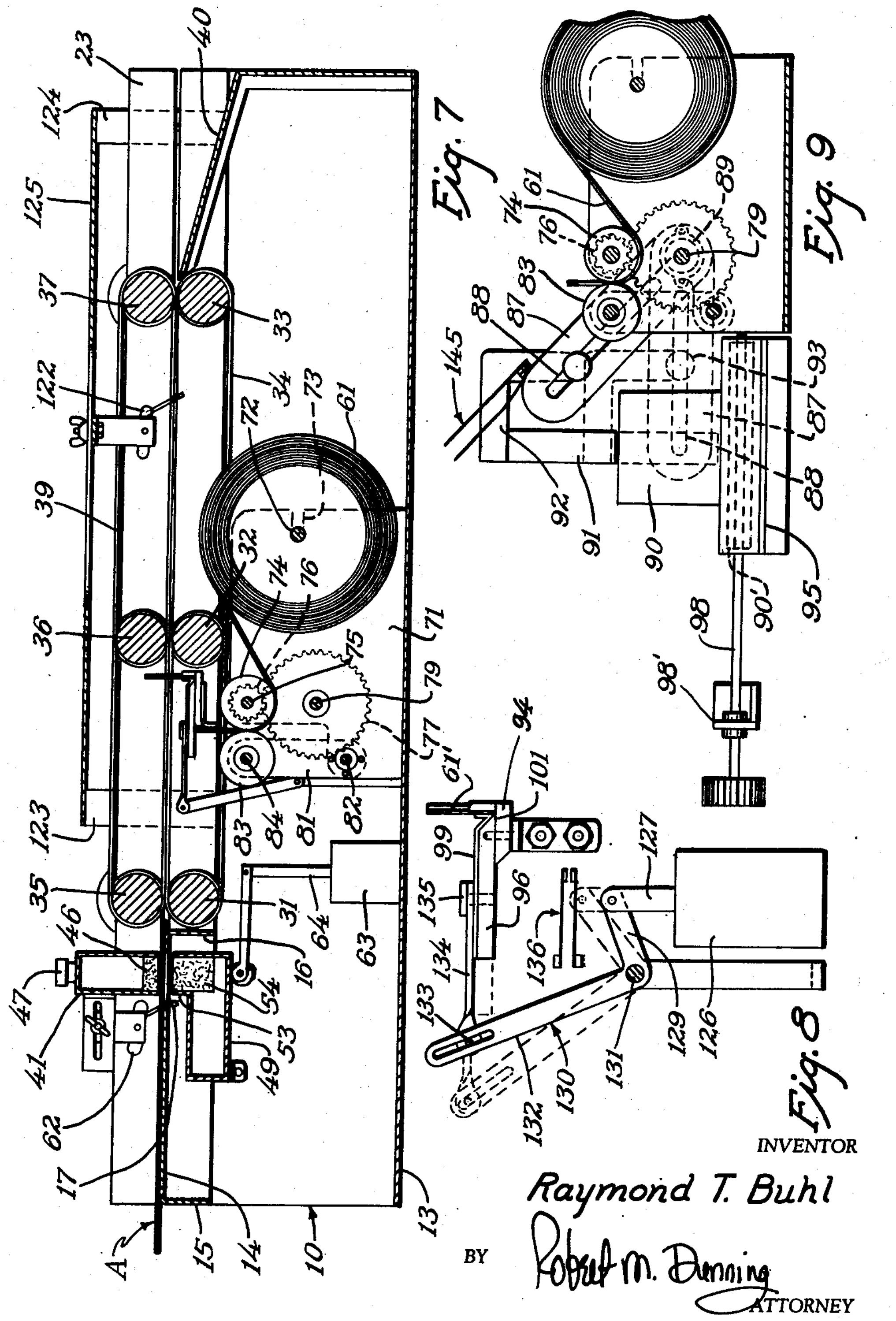
Figure 7 is a longitudinal sectional view through the apparatus showing the general arrangement of parts therein.
Figure 8 is a diagrammatic view showing the tape cutting mechanism and omitting the remaining structure.
Figure 9 is an elevation view partly in section showing in detail the tape driving mechanism and omitting the remaining structure.

The switch 62 is properly positioned so as to elevate the moistening mechanism in time to moisten the forward edge of the folder during movement of the folder into the apparatus. In Figure 7 of the drawings, the switch 62 is shown forwardly of the tank 41 so as to close before the forward edge of the folder is between the moistening elements. It has been found that as each folder is moved into the apparatus, the movement will place the forward edge of the folder between the moistening elements as they are pressed together. By changing the location of the switch 62, the timing of this operation may be varied.

Figures 4, 5, 6:
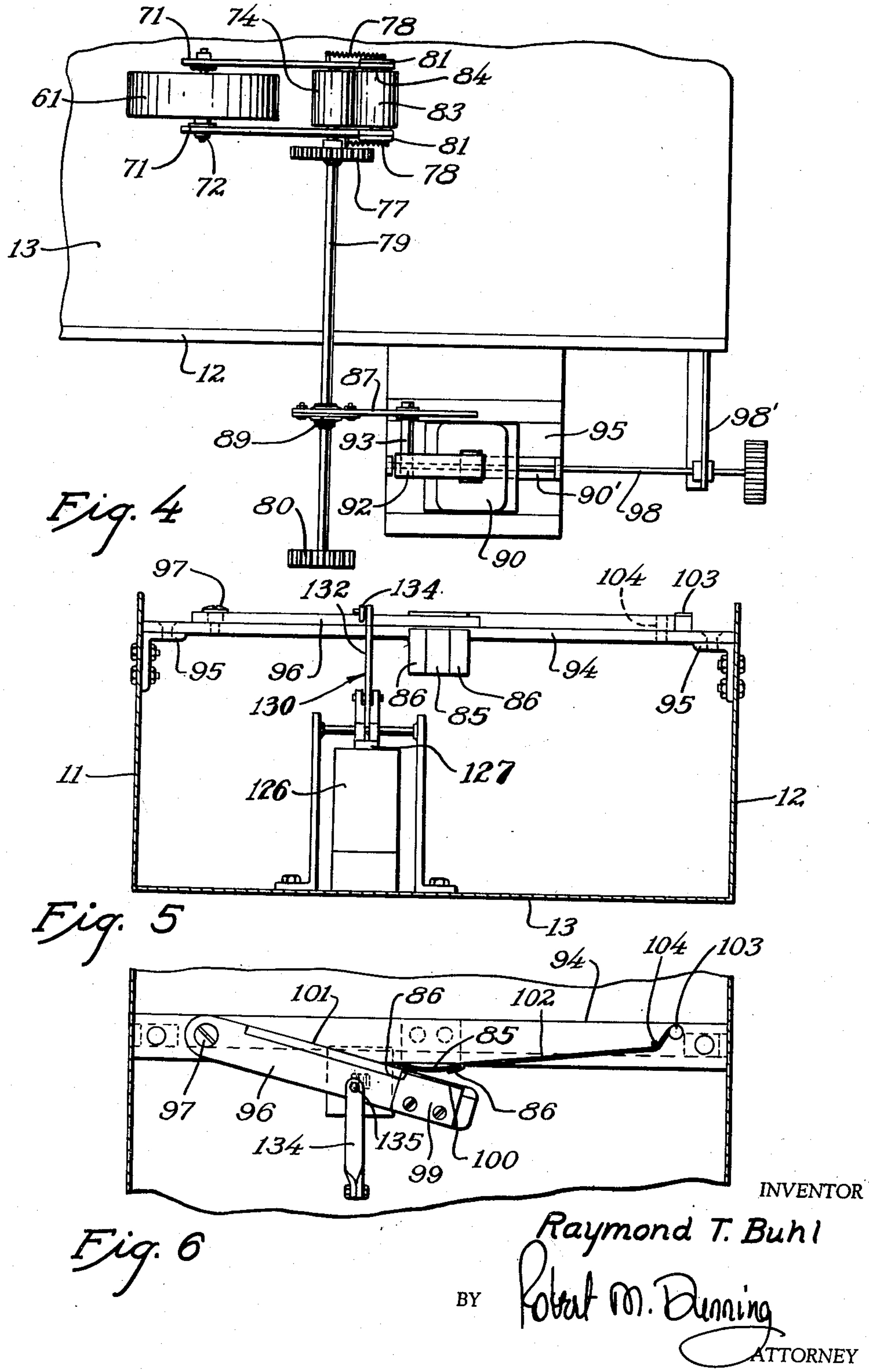
Figure 4 is an enlarged plan view of a detailed portion of the apparatus.
Figure 5 is a sectional view through a detail portion of the apparatus.
Figure 6 is a plan view of a detail portion of the apparatus.

The feed mechanism for feeding the adhesive coated strip or series of stamps 61 is best illustrated in Figures 4, 7, and 9 of the drawings. A pair of supporting plates 71 are provided on the frame bottom 13. A reel or spindle 72 is removably supported in slots 73 extending inwardly from opposed edges of the plates 71. A roll of stamps or an adhesive coated strip 61 is mounted upon the spindle 72. A feed roller 74 is supported upon a shaft 75 between the plates 71. The shaft 75 is provided with a pinion 76 thereupon which is in mesh with a gear 77 mounted upon a parallel shaft 79. The shaft 79 extends through the housing side wall 12 to a suitable drive mechanism. A knob 80 is provided on the outer end of the shaft 79 so that this shaft may be manually operated when necessary to adjust the location of the stamp relative to the cutter.

A pair of parallel arms 81 are pivotally supported upon a shaft 82 supported by the plates 71. An idler roller 83 is supported by a shaft 84 on the arms 81. Springs 78 act to urge the idle roller 83 against the drive roller 74 so as to clamp the strip of tape against the drive roller.

The tape strip 61 extends through a curved guide 85 having opposed edge enclosing flanges 86 thereupon. This guide 85 curves the stamp slightly along a horizontal arc so as to stiffen the stamp and to hold the stamp firmly upright. When held in curved or bowed position the stamp will stand upright more readily than where the stamp or tape is held flat. The guide 85 is located directly above the adjoining surfaces of the rollers 74 and 83 so as to receive the strip 61 after it passes between these rollers.

The drive mechanism for advancing the tape strip is best illustrated in Figure 9 of the drawings. A slotted arm 87 is supported upon the shaft 79 by means of a slip clutch 89 best illustrated in Figure 4 of the drawings. This slip clutch 89 permits free rotation of the shaft 79 in one direction, but holds the shaft from rotation in the opposite direction. As a result when the slotted arm 87 is rotated in a counter-clockwise direction from the position shown in full lines in Figure 9 to the position shown in dotted outline in this figure, the shaft 79 will rotate in a counter-clockwise direction. However, upon return oscillation of the slotted arm 87 from the position shown in dotted outline to the full line position in Figure 9, the shaft 79 will remain stationary. As a result the shaft 79 is rotated in one direction only by oscillation of the arm 87.

The arm 87 is oscillated by a solenoid 90. The solenoid 90 is provided with a core 91. An angular arm 92 is mounted upon the core 91. A pivot connection 93 is provided upon the angular arm 92. This pivot connection 93 extends through the slot 88 extending longitudinally of the arm 87 and acts to oscillate the arm 87 upon reciprocation of the arm 92.

The solenoid 90 is slidably supported upon a bracket 95 and is movable toward and away from the shaft 79. The solenoid 90 includes a threaded extension 90′ movable with the solenoid 90. A threaded rod 98 is engageable in the threaded extension 90′. The rod 98 extends through an angle bracket 98′ and is held in movement axially with respect to this bracket by suitable collars. A knob is provided on the rod 98 by means of which this rod may be rotated. As the knob is rotated the extension 90′ is moved axially of the rod, acting to move the solenoid 90 and its arm 92. This action moves the pivot 93 toward or away from the shaft 79 in the slot 88, thus changing the amount of oscillation of the arm 87. As the pivot 93 is moved toward the shaft 79, the shaft will be rotated a greater angular distance, while as the pivot is moved toward the free end of the arm 87, the angular extent of oscillation will be decreased.

Thus it will be seen that as the solenoid 90 is actuated the arm 87 will act to rotate the shaft 79 in a counter-clockwise direction as viewed in Figure 9 of the drawings, thus acting through the gear 77 and pinion 76 to rotate the shaft 75 and the drive roller 74 mounted thereupon. This action tends to drive the tape strip an adjusted distance for each actuation of the solenoid.

The tape strip 61 is fed upwardly through the bowed guide 85 so as to project above the level of the fixed cutter blade 94 mounted upon angle brackets 95 secured to the side walls 11 and 12. A movable cutter blade 96 is pivotally connected at 97 to the fixed blade 94. The movable blade 96 is provided with an angular pressure plate 99 thereupon which follows the contour of the blade 96 and terminates in an upwardly directed flange 100 extending upwardly from the cutting edge 101 of the blade. A flat spring 102 is anchored at 103 to the fixed blade and is held from movement in one direction by a pin 104 on the blade 94. This spring plate 102 extends on one side of the guide 85 while the pressure plate flange 100 extends on the other side of the stamp in open position of the movable knife blade 96. As the knife blade 96 moves in a counterclockwise direction from the position shown in Figure 6 of the drawings, the tape strip 61 is sheared between the blades 94 and 96. At the same time the upwardly projecting portion of the tape is clamped between the flange 100 and the spring blade 102 so as to hold the sheared off portion of the tape strip in an upright position. The blade 96 moves until it is substantially in line with the fixed blade 94 and the spring strip 102 holds the stamp or sheared off portion of the tape clamped securely against the flange 100 and in an upright position.

When the stamp is in the position shown in Figures 7 and 8 of the drawings, it is projecting above the level of the contacting conveyor belts. In other words, the center portion of the sheared off tape portion 61′ is substantially in line with the folded edge of a folder such as A moving between the belts 34 and 39. Therefore movement of the folder between the belts tends to fold the sheared off tape portion 61′ centrally between its ends so that part of the member 61′ overlies the top panel 55 while another part thereof underlies the other panel 56. As the folder and the stamp pass between the rollers 32 and 36, the stamp is firmly pressed against the moistened portion of the folder panels, thereby causing the same to adhere in place.

The rollers and the conveyor belts 34 and 39 supported thereby are driven in unison by any suitable means such as the motor 108. Operation of the motor 108 acts through the motor pulley 105 to drive the belt 106 which passes over the drive pulley 107. The drive pulley 107 is mounted upon a shaft 109 connected to the roller 31. As the various rollers and the conveyor belts are in contact with one another, rotation of the roller 31 tends to rotate the roller 35. Pulleys 110 and 111 are mounted for rotation with the rollers 35 and 37. A pulley 112 is mounted for rotation with the roller 32. A belt 113 connects these various pulleys 110, 111 and 112 and is held taut by an idle pulley 114. Thus all of the conveyors and rollers are driven in the proper direction and act continuously.

Figure 12:
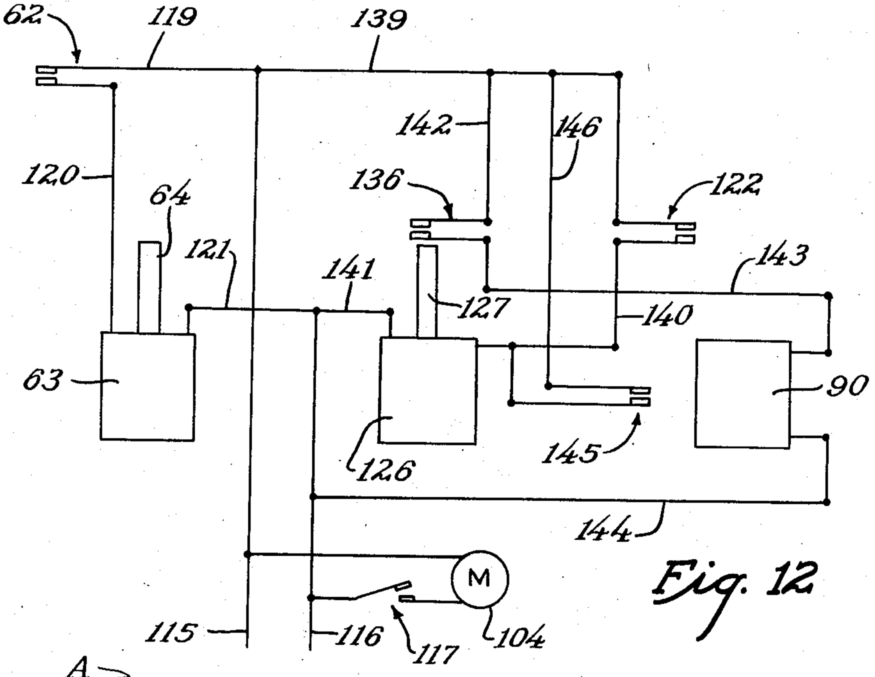
Figure 12 is a diagram of the wiring of the apparatus.

In Figure 12 of the drawings I disclose a wiring diagram which may assist in describing the operation of the device. Line wires 115 and 116 are connected through a switch 117 to the motor 108 to operate the same continuously as long as the switch 117 is closed. The line wire 115 is also connected by a conductor 119 to one terminal of the switch 62. The other terminal of the switch 62 is connected by conductor 120 to the solenoid 63. The solenoid 63 is connected by a conductor 121 to the line wire 116, thus completing the circuit to solenoid 63 when the switch 62 is closed.

As previously described when the solenoid 63 is actuated the tank 48 is pivoted upwardly to press the wick 54 and the pad 46 against opposite surfaces of the folder A, thus moistening predetermined areas thereof. The circuit to the switch 62 may remain closed throughout the passage of the folder A thereover as the ratchet device illustrated in Figure 11 causes momentary operation of the moistening apparatus. If desired the switch 62 may operate to close a circuit to the solenoid 63 only momentarily so as to produce a similar result.

As the folder A is engaged between the conveyor belts 34 and 39, the forward edges 59 and 60 of the folder are urged against the stamp or cut strip 61', bending this stamp centrally to fold against opposite sides of the folder within the moistening area. The folder and the stamp or tape applied thereto passes between the rollers 32 and 36 and are adhered together thereby.

As the folder passes between the conveyor belts it acts to close a circuit to a switch 122 adjustably supported longitudinally of the device. A pair of inverted U-shaped frame members 123 and 124 bridge the top of the machine and support a longitudinally extending strip 125 which acts to support the switch 122. Thus the position of the switch 122 may be adjusted to compensate for folders of varying lengths.

As indicated in Figure 12 of the drawings the switch 122 controls the circuit to the solenoid 126, controlling the movable cutter blade 96. The core 127 of the solenoid is pivotally and slidably connected to one arm 129 of a bell crank lever 130 pivoted at 131 to a fixed pivot. The other arm 132 of the bell crank 130 is pivotally and slidably connected at 133 to a link 134 connected to the movable knife blade 96 by a pivot 135.

The solenoid core 127 normally remains in the lowered position illustrated in full lines in Figure 8 of the drawings. When the switch 122 is actuated, the bell crank lever 130 is pivoted in a counter-clockwise direction into the position shown in dotted outline in Figure 8. This acts to pivot the movable knife blade 96 into the open position shown in Figure 6 of the drawings. A switch 136 is supported in the path of movement of the core 127 so that elevation of the solenoid core 126 acts to close the switch 136.

The circuit through the switch 122 is shown in Figure 12 of the drawings. One terminal of the switch 122 is connected by conductor 139 to the line wire 115. The other terminal of the solenoid 122 is connected by conductor 140 to the solenoid 126. The solenoid 126 is connected by conductor 141 to the line wire 116, thus completing the circuit when the switch 122 is closed.

The switch 136 controls the circuit to the tape driving solenoid 90. One terminal of the switch 136 is connected by conductor 142 to conductor 139 leading to line wire 115. The other terminal of the switch 136 is connected by conductor 143 to the solenoid 90. The other solenoid terminal is connected by conductor 144 to the line wire 116, thus closing the circuit to the solenoid 90. Thus as the knife blade 96 reaches open position the tape driving mechanism, best shown in Figure 9 of the drawings, is actuated to drive the tape strip in a manner to elevate an additional stamp when the knife blade 96 is in open position.

A normally open switch 145 is provided in the path of movement of the slotted arm 87, this arm acting to hold the switch contacts open. This switch 145 acts to control a holding circuit to the knife blade actuating solenoid so as to insure the holding of the knife blade in open position until the stamp or tape strip has been fully elevated. One terminal of the switch 145 is connected to the solenoid 126, the other terminal of which is connected to the line wire 116. The other terminal of the switch 145 is connected by the conductor 146 to conductor 139, leading to the line wire 115. In other words, the switches 122 and 145 are arranged in parallel. As long as the arm 87 is in motion the knife blade solenoid 126 holds the knife blade in open position. As soon as the arm 87 drops into the position shown in full lines in Figure 9 of the drawings, the switch 145 is opened thus opening the circuit to the solenoid 126 and allowing the knife blade 96 to return to its normally closed position. This action also shears off the next successive stamp or tape strip and holds the same in the path of movement of the next folder. Various devices could be employed for controlling the apparatus, the particular method illustrated being illustrative of one means of accomplishing this result. It is necessary that the folder moistening apparatus be actuated so as to moisten the forward edge of the folder along predetermined areas. It is necessary that the stamp be supported in the path of movement of the folder and that the spring clamp hold the stamp in such a way that it will be released by movement of the folder. It is necessary that the knife blade be in open position when the tape driving mechanism is actuated to advance the tape or stamps upwardly. Any system or control may be employed for accomplishing this result.

My device is adjustable for folders of varying lengths and varying thicknesses, the rollers supporting the conveyor belts being separable by a folder passing therebetween. By rotating the shaft 98 in one direction or another, the length of the cut off strip 61' may be regulated. The position of the tape strip or stamp may be initially regulated by the knob 80, acting through the clutch 89.

If desired, the entire device could be tilted to slant downwardly from the inlet end. This would have the advantage of raising the liquid level in tank 49 above the level of the upper end of the wick 54, thus supplying liquid faster than it otherwise might. Similarly the ends of the tank could be extended and the ends increased in height on one or both sides of the table 14 to provide a head of liquid above the wick 54. Suitable water spraying mechanism could also be substituted for the wicks, if desired.

In accordance with the patent statutes, I have described the principles of construction and operation of my tape applying apparatus, and while I have endeavored to set forth the best embodiments thereof, I desire to have it understood that these are only illustrative thereof and that obvious changes may be made within the scope of the following claims without departing from the spirit of my invention.

I claim:

1. An apparatus for applying a length of tape to opposed marginal portions of a movable member, the apparatus including means for moving the movable member, tape feeding means, electromagnetic means for actuating said feeding means to feed a predetermined length of tape into the path of the movable member, cutting means for severing the tape, means supporting the cut tape in a plane at substantially right angles to the plane of movement and intersecting the same, second electromagnetic means for operating the cutting means, switch means in circuit with said first mentioned electromagnetic means for energizing same, means associated with said cutting means for closing said switch means only when said cutting means is in open position to thereby cause energization of said first electromagnetic means, and second switch means in circuit with said first electromagnetic means, said second switch means including an element in the path of said movable member for closure of said second switch means by said movable member.

2. An apparatus for applying a length of tape to opposed marginal portions of a movable member, the apparatus including means for moving the movable member, tape feeding means, solenoid means for actuating said feeding means to feed a predetermined length of tape into the path of the movable member, cutting means for severing the predetermined length of tape including a pair of relatively movable knife edges, second solenoid means for separating the knife edges, means supporting the cut tape in a plane at substantially right angles to the plane of movement and intersecting the same, switch means in circuit with said first mentioned solenoid means for energizing same, means carried by said second mentioned solenoid means for closing said switch means only when said second solenoid is deenergized to thereby energize said first solenoid means, and second switch means in circuit with said first solenoid means, said second switch means being at a predetermined location in the path of said movable member for closure by said movable member.

3. An apparatus for applying a length of gummed tape to a plurality of adjoining surfaces of a movable member, the apparatus including a liquid containing reservoir superjacent the path of movement of the movable member, said reservoir carrying means for moistening a portion of the upper surface of a movable member, a second liquid containing reservoir subjacent the path of movement of said movable member, one end of said second reservoir carrying means for moistening a portion of the lower surface of the movable member and the other end of said second reservoir being pivotally mounted with respect to the apparatus, a cam in engagement with said second reservoir, said cam having at least one promontory for raising the first mentioned end of said reservoir to thereby cause its moistening means to apply moisture to the movable member, means associated with said cam to automatically lower said reservoir after momentarily raising the same, solenoid means for actuating said cam, switch means in circuit with the solenoid means, said switch means being operable by the movable member to energize said solenoid means when said movable member is in a preferred position with respect to the moistening means of said second reservoir, means for moving said movable member, and means for applying the gummed tape to the moistened portions of the movable member.

4. An apparatus for applying a length of gummed tape to a plurality of adjoining surfaces of a movable member, the apparatus including support means over which the member is fed, a first reservoir positioned at an elevation above said support means, a second reservoir positioned at an elevation below said support means, said reservoirs each being provided with adsorbent pad means for moistening portions of the adjoining surfaces of said movable member, means pivotally supporting one of said reservoirs, and means for pivoting the pivotally supported reservoir in a direction toward said movable member so that engagement therewith will urge said movable member into engagement with the moistening means of said other reservoir, the adsorbent pad means of said other reservoir being normally out of the path of movement of said movable member.

5. The structure described in claim 4 and including means for supporting the tape at substantially right angles to the plane of movement of the movable member and intersecting the path of movement of the movable member.

6. An apparatus for applying a length of gummed tape to a movable member having a pair of oppositely directed parallel surfaces, the apparatus including support means over which the member is fed, a first reservoir fixedly positioned above said movable member and said support means and out of the normal path of movement of said movable member, a pivotally mounted second reservoir positioned below said movable member and said support means, said reservoirs each carrying a moistening element for moistening portions of said parallel surfaces, cam means contiguously disposed beneath said second reservoir, said cam means having at least one promontory, and solenoid means for rotating said cam means to pivot said second reservoir to cause its moistening element to deflect said movable member into moistening engagement with the moistening element of said first reservoir.

7. The structure described in claim 6 in which said solenoid means is energized by switch means placed in the path of said movable member.

8. A tape applying apparatus comprising means for moving an article to be taped, a reservoir having one end pivotally mounted and the other end carrying wiping means for transferring moisture to said article, means for pivoting said reservoir to bring said wiping means into contact with said article, and means in the path of said article for effecting operation of the pivoting means, a second reservoir and wiping means normally out of the path of movement of the article, pivotal movement of the first mentioned reservoir moving the article against said second wiping means.

9. An apparatus for applying a length of tape to opposed marginal portions of a movable member, the apparatus including means for moving the movable member, means for feeding a length of tape into the path of the movable member, means supporting said tape on a plane substantially normal to the plane of the article to be taped, means for cutting the tape so that the mid portion of the cut tape length is substantially in the plane of movement of the movable member, and means in the path of the movable member for causing operation of said cutting means.

10. An apparatus for applying a length of tape to opposed marginal portions of a movable member, the apparatus including means for moving the movable member, means for feeding a length of tape into the path of the movable member, means supporting the tape in a plane at substantially right angles to the plane of movement of the movable member, means for cutting the tape so that the mid portion of the cut tape length is in said plane of movement, means in the path of the movable member for causing operation of said cutting means, and means associated with said cutting means for causing operation of said feeding means only when said cutting means is not cutting.

11. An apparatus for applying a length of tape to opposed marginal portions of a movable member, the apparatus including means for moving the movable member, means for feeding a predetermined length of tape into the path of the movable member, means supporting the tape in a plane at substantially right angles to the plane of movement of the movable member, means for cutting the tape so that a mid portion of the cut tape length is in said plane of movement, electromagnetic means for actuating the cutting means, and switch means in circuit with the electromagnetic means for energizing same, said switch means having an element thereof in the path of said movable member for actuation by said movable member.

References Cited in the file of this patent

UNITED STATES PATENTS

| Number | Name | Date |
|---|---|---|
| 160,360 | Snow | Mar. 2, 1875 |
| 543,440 | Devlin | July 23, 1895 |
| 603,458 | Sundstrom | May 3, 1898 |
| 605,400 | Crocket | June 7, 1898 |
| 1,055,910 | Hoover | Mar. 11, 1913 |
| 1,192,625 | Hanger | July 25, 1916 |
| 2,050,457 | Ohlsen et al. | Aug. 11, 1936 |
| 2,061,524 | Storck | Nov. 17, 1936 |
| 2,248,744 | Cohen | July 8, 1941 |
| 2,329,669 | Tuthill | Sept. 14, 1943 |
| 2,434,942 | Magee | Jan. 27, 1948 |
| 2,437,198 | Kay | Mar. 2, 1948 |
| 2,564,901 | Hess | Aug. 21, 1951 |

FOREIGN PATENTS

| Number | Country | Date |
|---|---|---|
| 21,274 | Great Britain | of 1913 |